No. 691,298. Patented Jan. 14, 1902.
A. A. E. STERZING.
TRANSMITTING ELECTRIC CURRENTS.
(Application filed Aug. 11, 1900.)
(No Model.) 2 Sheets—Sheet 1.
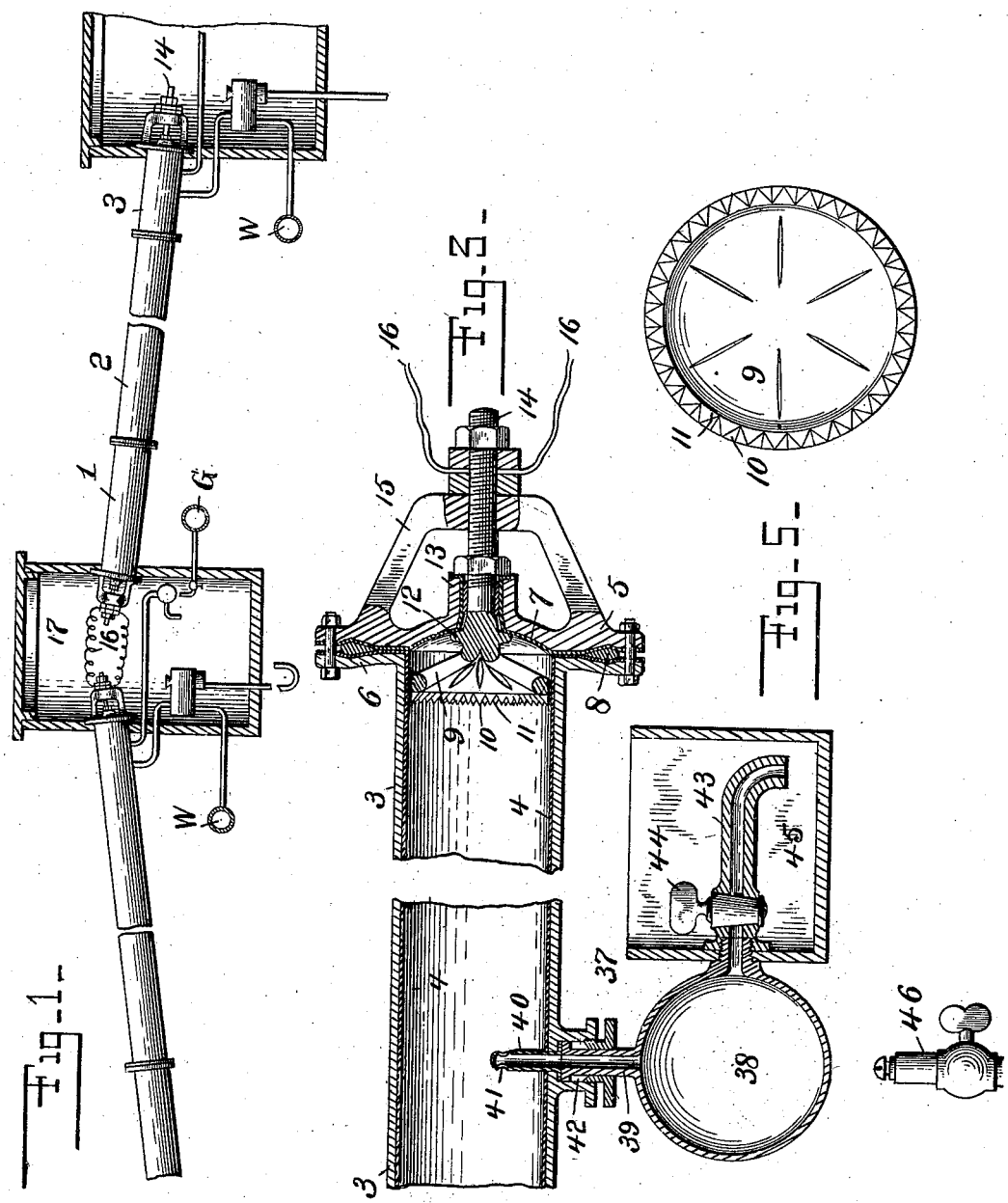
WITNESSES:
F. N. Roehrich
J. M. Harby
INVENTOR
Albert A. E. Sterzing
BY
J. B. McGirr.
ATTORNEY

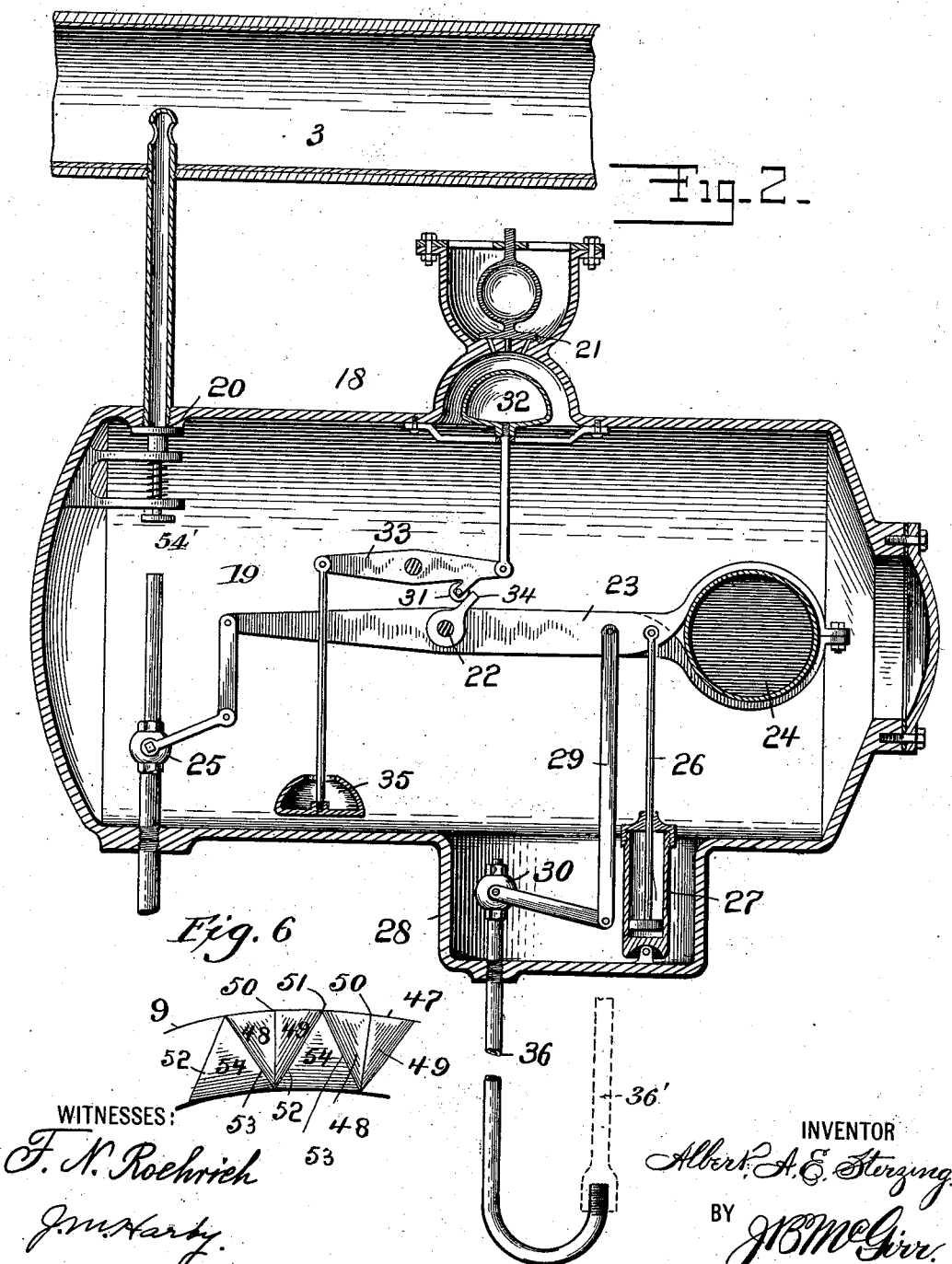

UNITED STATES PATENT OFFICE.

ALBERT AUGUST ERNEST STERZING, OF NEW YORK, N. Y.

TRANSMITTING ELECTRIC CURRENTS.

SPECIFICATION forming part of Letters Patent No. 691,298, dated January 14, 1902.

Application filed August 11, 1900. Serial No. 26,651. (No model.)

*To all whom it may concern:*

Be it known that I, ALBERT AUGUST ERNEST STERZING, a subject of the Queen of England, and a resident of New York, in the county of New York and State of New York, have invented certain new and useful Means for Transmitting Electric Currents, of which the following is a specification.

The object of my invention is to provide means whereby an electrical current can be conveyed any distance without the loss that is so common in the present methods.

To this end the invention consists, first, in a pipe-line made up of sections of any desired length and having their ends hermetically sealed; second, in having the sections partially exhausted of air and filled with vapor, by which means the electric current is conducted or transmitted from the main supply-station to the various branches, and, third, in various appliances to keep the rarefied air within the pipe at a given degree of rarefication and moisture.

In the drawings which form a part of this application, Figure 1 is a partial side view of my system; Fig. 2, a sectional view of the air-exhauster; Fig. 3, an enlarged sectional view of one of the pipes, showing its construction; Fig. 4, a sectional view of the vapor-supplying apparatus; Fig. 5, an enlarged end view of the dissipator or collector; Fig. 6, an enlarged view showing the teeth.

Like numerals of reference designate like parts through the several views.

After the system has been built the exhauster is started in its operation to exhaust the atmospheric air within the pipe-section, which operation is repeated until the said section contains air of the desired degree of rarefication. When this has been done, water is placed in a vessel located in the manhole close to the spherical body and the valve or cock of the same opened; when the pressure of the atmosphere causes the water to pass from said vessel to the spherical body, where by reason of the flame beneath the same and the absence of pressure from the conduit-section the water will become evaporated. The conduit being then ready for the transmission of the electric current, the wires are connected with the system and the current turned on.

To transmit electrical currents for any great distance with as little leakage as possible, it will be found advantageous to form each section between the ends or heads with a number of pipe-sections 1, 2, and 3, which may be of any desired non-conducting material or may be of metal having a suitable lining therein of some insulating material 4, as shown, the pipes 1 and 3 having flanges 6, to which the head 5 is connected. The flanges on the pipe, with its insulating material, and the head 5, having a like covering 7, completely insulate the heads from the pipe-line, and the two when put together form a recess, in which is placed rubber or other material 8, which will further assist in hermetically sealing the ends of the section from leakage.

Centrally located in the head 5 is the dissipator or collector, which consists of a flat-faced ring or disk 9, slightly smaller in diameter than the inside of the pipe, and about its outer flat face has two rows of projections 10 and 11, from the several edges and apex of which the current is dissipated into the rarefied air within the pipe-section or is collected from the same. The apexes 50 and 51 of the projections 10 and 11 are concentrically located on the outer edge of the disk 9 and point in the direction of the length of the pipe, while in design the projections are preferably triangular in cross-section, the projections 10 having their outer face or side 47 to the outer circumference of the disk, while its beveled or inclined sides 48 and 49 slope downwardly toward the center of the disk 9, the extreme rearmost portion of the projection extending to the inner side of the disk 9. The projections 11 are about the same size as those above described, but differ only in that the apex 51 is in alinement with the flat face 47 of the projections 10, the latter having perpendicular triangular walls with downwardly-inclined bevel from the apex 51 to the base of the tooth. By this arrangement the outer portion of the disk is entirely covered with these projections. The row of teeth 11 has its apex on the outer circumference of the disk, with its main body portion and its downwardly-inclined beveled face 54 diverging therefrom, while the projections or teeth 10 have their body portion and apex on the outer circumference of the disk, with the lower body portion converging from the face 47 toward the center of the disk, where the base-lines of the teeth 10 and the teeth 11 intercept each other on the disk 9, as is represented by 52 and 53.

The disk 9 has on the rear of the same a small head 12, which abuts the head 5, and the space between the hub 13 and the extending screw 14 of the dissipator may have rubber or other material therein that will hold the screw in place, while at the same time acting as an insulation, the head having extended arms 15 to further assist in keeping the parts in alinement, as well as to give a space for clamping the dissipator or collector in place and attaching feed-wires thereon. The body portion of the disk 9, which is concaved, has openings to allow free circulation of the vaporous medium. The electric current passes from the wires to the dissipator, where it is dissipated by means of the projections 10 and 11 into the vaporous medium, which becoming excited has greater molecular energy and higher conducting power, inasmuch as the electrified molecules come in contact with each other more often and because the infinitesimal space between them is lessened. The current thus passes to the other end of the pipe-section, where is located a collector in construction and manner of attachment the same as above described, where the projections insure easy transition to the metallic base, from whence it may be transmitted by other sections in any direction or for any desired distance.

Situated at a suitable place will be the exhauster 18, consisting of a tank 19, with suitable valves 20 21 to exhaust the air from the pipe-section to which it is applied, the air entering the tank 18 through the valve 20 and discharging the same through the valve 21. Located on the shaft 22 is a lever 23, carrying on one end an air float or counterpoise 24, and its other end connected with a water-inlet valve 25 by means of a link. To the forward end of the lever 23 is also connected a piston-rod 26, which operates within a cylinder or dash-pot 27, pivotally hinged to the extension of the tank, while suitably located behind the rod 26 is a link 29, which connects and operates the outflow-valve 30. When the exhaust apparatus is put into operation, water being turned on enters the tank through the inlet-valve 25. The velocity of the water entering the tank 18 strikes the bottom of the disk 54' on the spring-valve 20 and causes the same while the water is entering the tank to be held closed. The water continues to flow into the tank, and the entrapped rarefied air within the exhauster is compressed by the incoming water and lifts the valve 21 from its seat, so that all the air within the tank or exhauster is forced out by the rising water. The counterpoise or float 24 would continue to rise with the water, but is prevented by reason of the wheel 31 and the extending arm 34, which is in contact with it, the point of contact between the last-mentioned parts being on a line with the pivot of the lever 33. Thus the counterpoise or float 24 is prevented from further movement until the water rises within the tank to a point when it will lift the float 32, and as the lever 33 rocks it releases the stud 34 and permits the counterpoise or float 24 by its buoyancy to rise (because of its buoyancy the float would rise suddenly) when released by the small wheel 31; but it is checked by the dash-pot 27, the latter permitting the float 24 to ascend very slowly, and thereby cutting off the flow of water from the valve 25 and at the same time opening the discharge-valve 30. This gives a preponderance of water nearly the diameter of the exhauster to the column of water in the extension or discharge-pipe 36, which normally counterbalances the pressure of the atmosphere. Hence a great discharge of water takes place at the discharge end of the pipe 36, and at the same time the valve 54' is open and a discharge from the conduit takes place. If the capacity of the exhauster in relation to the miles of conduit that is built is such that its cubic contents in water above the inverted cup 35 reduces the pressure to the normal again when the inverted cup is just immersed, the exhauster will only operate again when further leakage of air causes the inverted cup to be wholly out of water. It will be understood that the large amount of water discharged must reduce the pressure or effect rarefication in the miles of conduit. The few inches of water which causes the inverted cup 35 to operate the mechanism is only discharged from the pipe 36 when the pressure within the conduit is slightly raised, which allows such discharge to take place. The degree of rarefication varies only slightly within the pressure of a column of water a few inches high which is practically uniform. Should there be any leakage of air by reason of a defective joint or by possible defects in the pipe-sections, the slight increase of pressure on top of the balancing column of water contained in the exhauster and the long upturned discharge-pipe 36 causes the water therein to overflow at the return bent-up section. The receding water in the exhauster no longer immersing the cup 35, the mechanism opens the supply-valve 25 and cuts off the discharge-valve 30.

When the several pipes forming a section and the several sections which form the system have their heads hermetically as well as otherwise secured in place, then the transmitting medium is introduced into the interior of the several sections. The electric connection 16, consisting of one or more wires, is then made to the head, and the current is immediately or instantaneously transmitted from the dissipator at one end by the vaporous medium within the section to the other end of the section, where it is collected to be further distributed as may be desired. Each of the said sections contains air at less than ordinary density artificially charged with vapor, the latter acting as a conductor the diameter of the pipe-section, thus insuring less resistance and higher conductivity. When the current of electricity is turned on at the generating-station, the same is conveyed to the conduit by means of one or more wires 16, and in consequence raises the pressure of the rarefied air by reason of the heat generated by the current passing through the conduit-section the exhauster would at once be started into operation and exhaust the air to an unnecessary degree of rarefication. To avoid this and to compensate for the increase of pressure, a short section of pipe 36' is added to the upturned discharge-pipe 36. Thus the normal column of water which is sustained in the pipe counterbalances the atmospheric pressure in conjunction with the rarefied-air pressure in the conduit. When the water in the tank is below the level of the cup, the weight of the cup and the water therein overbalances the opposite end of the lever carrying the float or bulb 32. When the water in the tank is above the cup 35, the water within and about the outside of the cup partly sustains the same to the extent of causing the opposite end of the lever to counterbalance the cup, and thus lock the parts 31 and 34 until the water rises sufficiently to release them. When the water is cut off from the supply-valve 25 and the discharge-valve 30 is opened, the water will pass from the tank to pipe 36, which, having a long bent-up section, overcomes the pressure of the superimposed atmosphere at the short turned-up portion and allows the water in the tank to escape. The valve 21 by its own weight closes the ports under its seat and by the partial vacuum created by the escaping water at the elbow or turned-up section 36 causes the valve 21 to become firmly seated and at the same time overcomes the spring on the valve 20, thus allowing the rarefied air in the pipe-section to enter the tank 18. The float or bulb 32 will descend as the water recedes until prevented by the wheel 31 pressing against the opposite side of the stud 34, (illustrated in Fig. 2,) in consequence of which the counterpoise or float 24 is retained above the falling water in the tank until the inverted cup 35 is above the water-level, which then will overbalance the weight of the float or bulb 32 and allow the stud to pass under the wheel 31. The counterpoise 24, acting as a weight, overbalances the weight of the lever 33, thus closing the discharge-valve 30 and opening the water-supply valve 25.

At a suitable place, preferably located within a manhole or duct 17, is the vapor-supplying apparatus, which consists of a globular vessel 38, having suitable connections 39 with the interior of the pipe-section through a stuffing-box 42, the inner projection 40 having suitable perforations 41 about its upper end, through which the vapor is conveyed or discharged from the vessel 38 to the pipe-section. The vessel 38 has an outwardly-projecting pipe 43, with a cock 44, which extends within a vessel 45, containing water. When it is desired to renew or add to the vaporous medium within the pipe-section, the gas-jet 46 is lighted and the water within the vessel thus permitted to become so heated that the vaporous medium therefrom passes from the vessel 38 into the pipe-section. This operation may be repeated as many times as occasion may require. For instance, where the section is very long between the heads 5 the operation may have to be repeated once or twice.

Manholes or ducts have been shown at the ends of the sections; but it will be understood that they are not necessary at frequent intervals, although one will be provided at the distributing and another at the collecting section unless it is desired to have branches between the points above mentioned. The manholes or ducts will be so located when possible as to have access to the gas-supply main G and to the water-supply main W, so that connections can be made for their use when desired.

It is understood that devices have been devised to exhaust air from chambers of various characters; but the combination and arrangement of the apparatus, together with the other parts which form my system, is such that makes it preferable, as well as cheaper, for conveying high-potential currents for a long distance to be used in various ways at the end of the system or at its many branches that may be made throughout its length.

What I claim is—

1. In a system for transmitting electric currents, the combination with a series of pipe-sections, of heads for closing the same having means for dissipating and collecting the current, of means for exhausting the air from said pipe, and means for admitting vapor therein, all substantially as described.

2. In a system for transmitting electric current, the combination with a series of pipes, of hermetically-sealed heads inclosing each section, of a dissipator or collector fitted thereto, of a device to exhaust the air from said section, and another device for supplying vapor therein, all substantially as described.

3. In a system for transmitting electric current, the combination with a series of sections having hermetically-sealed heads secured thereto, of a disk having one or more concentric rows of points, of an exhaust apparatus to automatically exhaust the air, and a vapor device arranged to supply the same at suitable intervals, all substantially as described.

4. In a system for transmitting electric current, the combination with a series of sections having hermetically-sealed heads, of disks within the sections having one or more rows of projections, of means for locking same in place, and an apparatus for making and supplying vaporous air to the section, all substantially as described.

5. In a system for transmitting electric current, the combination with pipe-line having insulated walls, of a hermetically-sealed insulated head, of means within said section for dissipating and collecting the electric current, of an apparatus for automatically exhausting the air from the pipe-section, and means for supplying vapor therefor as a medium for the transmission of the electric current, all substantially as described.

6. In a system for transmitting electric current, the combination with the pipe-line, of the head 5, the disks 9, having dissipators 10 and 11, thereon, of a tank 18, to exhaust the air, of vapor-supplying means 38, all insulated and hermetically sealed to prevent the escape of the electric current, and means for transmitting the same, all substantially as described.

Signed at New York, in the county of New York and State of New York, this 12th day of May, A. D. 1900.

ALBERT AUGUST ERNEST STERZING.

Witnesses:
J. B. McGirr,
F. N. Roehrich.